3,094,378
PROCESS FOR LEACHING OF ALUMINA FROM ALUMINOUS MATERIAL
Neil H. Wolf, 1009 Thirba St., Metairie, La.
No Drawing. Filed Sept. 13, 1961, Ser. No. 138,238
7 Claims. (Cl. 23—52)

This invention relates to a novel extraction method for recovering purified alumina from finely divided aluminous material or ores and more particularly relates to caustic soda extraction of aluminous ores at elevated temperatures of about 225–450° F. in which there is present in the hot caustic soda digesting solution an alkali metal compound of boron in an amount which is effective to increase the amount of pure alumina recovered by the extraction beyond that which would be recovered in the absence of said alkali metal boron compound and which further reduces the time required for more efficient recovery of pure alumina.

It has been discovered that alkali metal boron compounds, such as obtained from alkali metal hydroxide neutralization of boric acid, of tetraboric acid, sodium metaborate, dehydrate, sodium tetraborate (anhydrous), hydrates of sodium tetraborate such as the pentahydrate and the decahydrate (borax), sodium perborate and sodium perborate tetrahydrate when added to a caustic soda digestion liquor containing from 40 grams up to 400 grams of NaOH per liter will surprisingly increase the recovery of pure alumina, usually within the first 15 minutes to first hour of caustic extraction far beyond that which can be achieved when the caustic soda is used without the borate addition as the hot digestion liquor. Remarkably, the alumina which is recovered by decomposition is less likely to be contaminated with ferric oxide impurity as may be the case when the conventional Bayer caustic soda extraction process is carried out. In the American Bayer process the commercially recommended concentration is about 75–150 grams of caustic soda (as NaOH) per liter to provide a moderate caustic range for digestion which is carried out at 290–300° F. for about one hour. In the European Bayer method a high concentration of alkali is used which is about 250–400 grams NaOH per liter and extraction is carried out at higher temperatures, 350–400° F. for a longer time period of about 2–4 hours.

It is an object of the invention to provide an improved process for caustic soda extraction of aluminous ores using together with said caustic soda an effective amount of alkali metal compound of boron dissolved in said caustic soda whereby the efficiency of extraction is increased and the time for extraction is reduced in the recovery of pure alumina from the caustic soda liquor.

It is a further object of the invention to provide a novel modified caustic soda extraction method employing effective amounts of dissolved alkali metal boron compound in the caustic digestion liquor which is adapted to provide efficient recovery of pure alumina from low grade ores as well as high grade bauxite ores, these low grade ores containing substantial quantities of iron oxide and being found in considerable deposits in Kauai, Hawaii, Oregon, Washington, Arkansas, Jamaica, British Guiana, Costa Rica, France, Italy, Yugoslavia, Indonesia and elsewhere.

These low grade ores are characterized by their high proportion of iron oxide and silica, e.g., from about 15–40% iron oxide mostly as $Fe_2O_3$, and up to about 26% of silica with a loss of weight from about 10–40% on ignition. The iron oxide impurity may take the form of hematite, limonite or ilmenite or siderite and the ore may contain substantial amounts of gibbsite, boehmite, diaspore bauxitic clay and diasporic clay. Also high alumina content aluminum-calcium phosphate ore such as found in Florida phosphate fields may be efficiently leached by the present invention.

To facilitate a better understanding of the differences between high and low grade aluminiferous materials, reference is made to a typical high grade bauxite analyses below:

| | Percent |
|---|---|
| Aluminum oxide | 50–60 |
| Ferric oxide | 0.5–25 |
| Silica | 1–7 |
| Volatiles: water (combined) | 12–40 |
| Titanium dioxide | 3 |
| Vanadium compounds | Trace |

In accordance with the process of the invention this ore is ground, leached with caustic soda and boron compound of the invention under pressure and at elevated temperature, the caustic aluminate is then filtered to separate it from the mud of iron oxide, silica and titanium dioxide, and the filtrate is decomposed by seeding with a special form of hydrated alumina with recycle of the caustic soda and boron compound after complete decomposition and separation of hydrated alumina product.

It is accepted in commercial practice that high iron oxide aluminous ores which contain less than about 32% of recoverable alumina by the Bayer process are generally not economical for recovery. See U.S. patent to Kamlet, No. 2,964,383, granted December 13, 1960, assigned to Reynolds Metals Company. As stated in this patent, in determining recoverable alumina, the content by analysis is corrected by subtracting 1.1 times the silica content.

In the commercial practice of carrying out the Bayer extraction process under optimum temperature conditions, e.g., 290–300° F. and at optimum caustic concentration, e.g., 150 g. NaOH/liter, the theoretical recovery (corrected for silica) is not reached because the hydrated condition of alumina in the starting bauxite ore and the physical characteristics of the residue are such as to cause precipitation of alumina already extracted in the form of sodium aluminate in the caustic soda solution. See U.S. patent to Porter, No. 2,668,751, assigned to Kaiser Aluminum Company, which describes these poor recoveries and proposes to calcine the ore to about 2–5% volatiles before caustic leaching to prevent thereby the formation of undesirable boehmite, a hydrated alumina form which is less soluble in the caustic and reverts to a precipitate. Porter mentions that a longer time of leaching and higher temperature of leaching can be successful in redissolving this retained alumina which precipitates out of the sodium aluminate mother liquor but properly points out that not only the longer time but increasing alkali concentrations are required and there results thereby undesirable silica contamination of the resulting alumina recovered after filtration and decomposition.

In contrast to this suggestion of Porter in U.S. Patent No. 2,668,751, the present invention eliminates the need for prior roasting of the starting ore to a controlled volatile content of 2–5% before the leaching step is carried out and provides a faster and surprisingly more efficient recovery of pure alumina which dissolves in the form of sodium aluminate in the caustic alkali solution at elevated temperatures without running into the problem of silica contamination due to longer retention time during digestion and without encountering the reversion or precipitation mentioned by Porter in carrying out the conventional Bayer extraction with starting ore as received with a relatively high volatile content (e.g., about 12–40% loss on ignition and usually stated as combined water).

It is a further object of the invention to provide a minimum of about 10 grams per liter of alkali metal boron compound for the lower effective caustic soda concentration of about 40–80 grams per liter and up to about 100–300 grams per liter of alkali metal boron compound for higher effective caustic soda concentrations in the range of 100–300 grams per liter whereby enhanced recovery of pure alumina is realized by the action of these amounts of alkali metal boron compound dissolved in the caustic leaching solution.

It has been discovered that a minimum amount of about 10 grams per liter of alkali metal boron compound at digesting concentrations of caustic soda of about 40 grams per liter and minimum amounts of about 60 grams per liter of alkali metal boron compound at caustic soda concentration of about 200–300 grams per liter are effective to increase the yield in significant commercial quantities during normal digestion periods varying from about 15 minutes to four hours.

Preferred amounts of alkali metal boron compound are larger than these minimum amounts. To illustrate, the minimum amount of 60 grams per liter of alkali metal boron compound in the case of completely neutralized boric acid (neutralized with three mols of sodium hydroxide) when raised to a concentration of about 100–250 grams and added to a caustic soda digestion solution containing 150 grams NaOH/liter used in a temperature range of 260–330° F. shows a recovery of alumina evidenced by the amount dissolved in the sodium hydroxide solution which is twice that passing into the NaOH solution under the same conditions of temperature and concentration in the absence of said dissolved alkali metal boron compound.

To better understand the novel process of the invention and its wide range of application to high as well as low grade ores, the following examples are given to point out and illustrate the invention but in no way to limit it to concentrations of reagents employed or to the specific conditions since obvious modifications will occur to one skilled in the art in carrying out the invention as disclosed throughout the description.

EXAMPLE I

This example shows the recovery of alumina by leaching with a control caustic soda solution and by leaching with this same concentration of caustic soda to which neutralized $H_3BO_3$ is added.

These unexpected results of improved alumina recovery are tabulated below in Table I and represents part of this illustrative example of the present invention.

The starting ore which was subjected to digestion with caustic soda was a low quality high iron oxide bauxite of the following analysis:

|   | Percent |
|---|---|
| Alumina, $Al_2O_3$ | 29.4 |
| Silica, $SiO_2$ | 19.2 |
| Iron oxide, $Fe_2O_3$ | 25.5 |
| Titanium dioxide, $TiO_2$ | 2.6 |
| Volatiles, loss on ignition | 22.6 |

The data for Table I below were obtained by making up a series of 100 milliliter volumes of caustic soda extracting solutions, a first series marked controls which contained 160 grams of NaOH per liter and a second series which contained 160 grams of NaOH/liter and which additionally contained 200 grams of $H_3BO_3$ neutralized with the stoichiometric quantity of NaOH, e.g., 3 mols of NaOH per mole of $H_3BO_3$.

Identical weights, 8.5 grams, of finely ground ore (200–300 mesh) of the above analysis were placed in a closed retort, thoroughly mixed with the 100 milliliter extracting solution and each sample was heated for one hour at the temperature tested in Table I below, this temperature being in the range of 260° F. to 330° F., and the pressure being built up at this temperature being due to the temperature of heating. For each run conducted at a given temperature with the neutralized boric acid addition there was run a side-by-side control at identical charge, identical caustic soda concentration, identical volume, identical temperature and identical time.

The amount of alumina extracted in accordance with the treatment of the invention is set forth in the second column of Table I below in terms of the percentage of the total alumina content of the starting ore which is extracted. If all of the 29.4 parts $Al_2O_3$ per 100 parts of ore were extracted this would be 100%, e.g., theoretical. This amount of alumina represented by percent of $Al_2O_3$ extracted is determined by analysis of the liquor and confirmed by decomposition of the liquor to recover the aluminum, and also by checking the weight loss of the mud residue remaining after extraction.

Temperatures of treatment are given in degrees Fahrenheit in column 1 of the table.

The control is set out in the third column of Table I.

*Table I*

| Temperature of Digestion, ° F. | Boron Addition Percent $Al_2O_3$ Extracted Using Neutralized $H_3BO_3$ | Control, Percent $Al_2O_3$ Extracted, No Boron Compound |
|---|---|---|
| 260 | 75.8 | 37.5 |
| 273 | 81.6 | 38.8 |
| 291 | 83 | 40.5 |
| 295 | 83.5 | 40.8 |
| 302 | 92 | 41.3 |
| 320 | 87.0 | 43.5 |
| 330 | 84.8 | 45.9 |

These data in Table I illustrate that with the control amount of NaOH of 160 grams per liter and using the low grade ore that there is a slight increase in extraction efficiency during the one hour treatment with increasing temperature, from 260° F. to 330° F. but at no temperature interval does the alumina recovery reach 50% of theory. In contrast, there appears to be an optimum temperature of extraction with this low grade ore using the boron compound, neutralized $H_3BO_3$, in the invention, this optimum being at about 290–330° F. The recovery of alumina is subtantially higher, e.g., about 83–92% at the upper end of the temperature interval than at the lower end, e.g., about 260–275° F. where recovery is about 75–82%.

Remarkably, the recovery in each instance of alkali metal boron compound is about twice that in the absence of this compound and as demonstrated by the control.

The temperature conditions of this example are within the temperature range of the conventional Bayer extraction process as practiced in the United States at moderate alkali concentration. The conventional Bayer process uses a caustic concentration up to 150 grams NaOH per liter at temperatures of from 290–300° F. and the charge is such that the pregnant caustic aluminate liquor gives a high alumina to caustic ratio, e.g., A/C ratio, of about .800 to .850 on a weight basis. It is seen that the surprising increase of extraction efficiency in the one hour interval with low grade ore of this example will likewise be found in the extraction of higher grade ore and the illustrated method of this example is thus useful to improve the efficiency of this conventional process.

EXAMPLE II

In this example the digestions of the same ore sampes as in Example I and the same procedure as in Example I were carried out using 200 grams of NaOH per liter in the control and in the run of the invention and using 200 grams of neutralized boric acid/liter in the runs of the invention along with 200 grams of NaOH. In each instance an 8.5 gram sample of ore was used with a volume of 100 cc. of digestion reagent. In each instance the extraction using alkali borate doubled in accordance with invention resulted in a doubling of the yield over the control.

EXAMPLE III

In this example the procedure of Example I was carried out with the same ore samples (8.5 gram) as in Example I but the temperature of digestion was run at 300° F. for 30 minutes using 260 grams NaOH/liter in the control run and borated liquor in the run of the invention in which the concentration of NaOH was 188 grams NaOH per liter and the borate concentration as sodium metaborate was 188 grams per liter. About 17.0 grams were covered with 100 cc. of digestion liquor for each run at the same stated temperature, 300° F., for 30 minutes. The yield of alumina extracted from the control run was 67.2%. The yield of alumina using less caustic soda in the run of the invention was 66.2%.

This demonstrates that substantially the same yield can be achieved by using a lower caustic soda content at temperatures in the higher end of the range used in the American practice of the Bayer process.

EXAMPLE IV

This example follows the procedure of Example I and demonstrates the suitability of the method of the invention in the European practice of the Bayer process up to temperatures of 450° F.

The control and test samples were extracted each 37.8 grams of ore per 100 cc. of extracting solution at high caustic soda level, e.g., 300 grams NaOH/liter at 450° F. for 30 minutes. Substantially better yields were obtained with the test sample containing 138 grams of sodium tetraborate decahydrate per liter and the same caustic soda concentration (300 grams/liter) than with the control.

The next runs were made at a temperature of 275° F. for 30 minutes and at this temperature there was a lower yield than in the previous runs at 450° F. (lower by about 20%).

EXAMPLE V

In this example, the samples of ore used in Example I were calcined at 600–700° C. to reduce the volatile content from 22% down to about 2.5–5% before the digestions. This calcining procedure is that recommended for high grade ore, Porter, U.S. Patent No. 2,668,751. The concentration of NaOH used in control and test digestions was 160 grams NaOH/liter. The concentration of borate used, sodium metaborate, in the test run was 213 grams per liter. The control yield of alumina extracted was 58.4% using the low grade ore of Example I previously calcined as in Porter. The test run gave a yield of 94.2% extracted. Both control and test runs were carried out at 320° F. for 30 minutes using identical charges and identical volumes of digestion liquor.

From the above results and the results in Table I, Example I, it is seen that the calcining step need not be made to obtain high yield, but that if it is employed with benefit as in this example, additional increase in yield is had using the borate extraction modifier of the invention.

The present method may be applied to either the American or the European Bayer extraction process and cuts down the time from about 3–4 hours to about 1–2 hours which makes for greater output per plant unit and saves on equipment.

In the European practice higher caustic concentrations are used, e.g. 250–300 grams NaOH/liter at temperatures of 350–500° F. As shown at the higher range of temperatures herein, the efficiency is increased at temperatures approaching 350° to permit improved extraction resulting from addition of the alkali metal boron compound. In this European practice, it is customary to use a lower charge, so that the pregnant liquor will have a much lower alumina to caustic ratio, not exceeding .750.

The present process is found to be specially adapted for the extraction of either high grade or low grade ore.

In cases where the finely ground ore need not be calcined, there is a further saving on equipment and of cost.

In fact, the improvement in extraction is such that it is within the scope of the present invention to carry out grinding simultaneously with leaching in a preliminary step of leaching treatment, during which the ore can be finely comminuted with the caustic soda containing the effective amount of alkali metal boron compound in solution therewith. This prewetting during grinding improves extraction efficiency by presenting freshly cut surfaces for exposure to the leaching solution and thus cuts down on the subsequent digestion step.

Temperatures of the solution of caustic soda and boron compound may vary from 100–190° F. during the preliminary grinding while leaching steps are effective to cut processing time by about ⅓ to ½ and this procedure is well adapted for low grade ores.

Although the foregoing example illustrates the use of boric acid neutralized with sodium hydroxide, e.g., three moles NaOH per mole $H_3BO_3$ and the use of borax. Equivalent to this form of the alkali metal boron compound are the salts of other alkali metals, e.g., potassium or lithium which are soluble in the caustic soda liquor.

When higher molecular weight products are used such as for example, borax which has a molecular weight of about six times that of boric acid, a corresponding larger amount of the boron compound is used. However, it is not always necessary to use six times as much in this case since borax concentrations of about 300–450 grams per liter are quite effective in moderate to high concentrations of caustic soda. When using sodium metaborate about the same amount is used as in the case of boric acid, but correction should be made for the water of crystallization particularly when the metaborate is used in the form of a di-hydrate.

Similarly, sodium perborate may be used in about the same amounts of sodium metaborate. However, it is preferred that the cheaper compounds of boron be used and such compounds as boric acid and sodium metaborate or borax (dehydrated) are particularly useful for this reason. It is a particular advantage of the invention that the boron compound once dissolved is an integral part of the circulating caustic leaching liquor which need not thereafter be removed.

It appears that the caustic soda solution modified with soluble boron compound has little if any silica dissolving effect, particularly in the short cycle of one hour which is sufficient for complete extraction. Conventional decylization procedures except under special circumstances need not be resorted to.

If minor amounts of silica are converted under special circumstances to a sodium aluminosilicate and extracted with the sodium aluminate liquor, then the $NaAlO_2$ filtrate is first submitted to a conventional desilication process. Desilication is best effected by digestion of the sodium aluminate solution under pressure which causes precipitation of the sodium aluminum silicate contained therein (French Patent 339,049 (1904), British Patent 19,924 (1904), German Patent 197,881 (1908), U.S. Patent 1,422,004 (1922), U.S. Patent 938,432 (1909), U.S. Patent 1,137,860 (1915)).

The desilicated sodium aluminate liquors may then be treated, as is conventionally done in the Bayer process, by "seeding" with a recycled charge of "seed alumina" (which is aluminum hydroxide from a previous charge) in amounts equivalent to 25% to 100% of the $Al(OH)_3$ contained in the sodium aluminate liquors, and the mixture is stirred approximately 45 hours by a submerged air-lift. During this period, 50% to 60% of the $Al(OH)_3$ in the sodium aluminate is precipitated.

The precipitated $Al(OH)_3$ is filtered off and washed free of soda with water. The washed $Al(OH)_3$ is filtered and calcined by conventional means to give an aluminum oxide, of suitable purity for use in the electrolytic manufacture of aluminum.

The invention is defined in the claims which follow.

I claim:
1. In a process for leaching alumina from finely divided aluminous material by digestion with aqueous sodium hydroxide solution, the concentration of said sodium hydroxide varying from about 40 grams to about 400 grams NaOH per liter at digestion temperatures of about 225° F. to about 450° F. that improvement consisting of adding an alkali metal boron compound soluble in said aqueous sodium hydroxide digestion solution, said alkali metal boron compound being a member of the class consisting of alkali metal metaborate, alkali metal tetraborate and alkali metal perborate, the amount of said alkali metal boron compound varying from about 10 grams per liter to about 400 grams per liter of digestion solution and said digestion is carried out for a period of about ½ hour to about 1 hour whereby the extraction of alumina from said aluminous material is increased over the amount which would be extracted in the absence of said alkali metal boron compound and the time for extracting alumina from the aluminous material is shortened under the stated temperature conditions of said digestion.

2. A process as claimed in claim 1 including the step of wetting the finely divided aluminous material with the solution of caustic soda and alkali metal boron compound while grinding the aluminous material to provide the finely divided material for the digestion step.

3. A process as claimed in claim 2 wherein said grinding operation is carried out in the presence of said digestion solution of sodium hydroxide and alkali metal boron compound which is heated to a temperature of about 100° F. to about 190° F. and thereafter additional digestion solution containing sodium hydroxide and alkali metal boron compound is heated to above 260° F. for about ½ hour to extract the alumina from said aluminous material.

4. A process as claimed in claim 1 wherein said alkali metal boron compound is sodium metaborate.

5. A process as claimed in claim 1 wherein said alkali metal boron compound is borax.

6. A process as claimed in claim 1 wherein the sodium hydroxide concentration is from 75 to 150 grams NaOH per liter, the digestion temperature is 290° F. to 300° F. for about ½ to 1 hour and the concentration of alkali metal boron compound is from 60 grams to 200 grams per liter.

7. A process as claimed in claim 1 wherein the sodium hydroxide concentration is from 250 to 400 grams NaOH per liter, the digestion temperature is 350° F. to 450° F. for about ½ to 1 hour and the concentration of alkali metal boron compound is from 100 grams to 250 grams per liter.

References Cited in the file of this patent

UNITED STATES PATENTS

| | | |
|---|---|---|
| 2,411,806 | Riesmeyer et al. | Nov. 26, 1946 |
| 2,935,377 | Jones | May 3, 1960 |